US010715382B2

(12) United States Patent
Guan et al.

(10) Patent No.: US 10,715,382 B2
(45) Date of Patent: Jul. 14, 2020

(54) METHOD FOR CONFIGURING SERVICE NODE, SERVICE NODE POOL REGISTRARS, AND SYSTEM

(71) Applicant: Huawei Technologies Co., Ltd., Shenzhen (CN)

(72) Inventors: Hongguang Guan, Nanjing (CN); Yang Wang, Nanjing (CN); Feng Li, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 516 days.

(21) Appl. No.: 14/988,420

(22) Filed: Jan. 5, 2016

(65) Prior Publication Data
US 2016/0134472 A1    May 12, 2016

Related U.S. Application Data

(63) Continuation of application No. PCT/CN2014/080106, filed on Jun. 17, 2014.

(30) Foreign Application Priority Data

Jul. 5, 2013 (CN) .......................... 2013 1 0283419

(51) Int. Cl.
*G06F 15/177*   (2006.01)
*H04L 12/24*    (2006.01)
(Continued)

(52) U.S. Cl.
CPC ...... *H04L 41/0806* (2013.01); *G06F 16/9537* (2019.01); *H04L 41/0816* (2013.01);
(Continued)

(58) Field of Classification Search
CPC . H04L 41/0816; H04L 41/12; H04L 41/5051; H04L 41/5054; H04L 41/5058;
(Continued)

(56) References Cited

U.S. PATENT DOCUMENTS 6,414,958 B1    7/2002  Specht
8,601,542 B1 *  12/2013 Eatough .................. H04L 67/06
                                                                709/212
(Continued)

FOREIGN PATENT DOCUMENTS

CN    1953399 A    4/2007
CN   101656765 A    2/2010
(Continued)

OTHER PUBLICATIONS

Lei, P., et al., "An Overview of Reliable Server Pooling Protocols," Network Working Group Request for Comments 5351, Sep. 2008, 15 pages.

(Continued)

*Primary Examiner* — Thuong Nguyen
(74) *Attorney, Agent, or Firm* — Slater Matsil, LLP

(57) ABSTRACT

A method for configuring a service node, a service node pool registrar, and a system are provided. The service node pool registrar receives a service node query request sent by a management configuration device, where the service node query request includes a service requirement, where the service requirement is from a user or caused by a network change; the service node pool registrar searches a service node database to obtain service node information that matches the service node query request and sends the matching service node information to the management configuration device, so that the management configuration device performs network and service configuration on the matching service node according to obtained network topology information and the matching service node information.

17 Claims, 9 Drawing Sheets

(51) Int. Cl.
*G06F 16/9537* (2019.01)
*H04L 29/08* (2006.01)
*H04L 29/06* (2006.01)
*H04L 12/751* (2013.01)
*H04L 12/26* (2006.01)

(52) U.S. Cl.
CPC .......... *H04L 41/12* (2013.01); *H04L 41/5051* (2013.01); *H04L 41/5054* (2013.01); *H04L 41/5058* (2013.01); *H04L 45/026* (2013.01); *H04L 63/02* (2013.01); *H04L 67/1002* (2013.01); *H04L 67/1095* (2013.01); *H04L 41/0893* (2013.01); *H04L 41/5096* (2013.01); *H04L 43/0817* (2013.01); *H04L 43/10* (2013.01); *H04L 63/1416* (2013.01)

(58) Field of Classification Search
CPC ............. H04L 41/0893; H04L 41/5096; H04L 45/026; H04L 43/0817; H04L 43/10; H04L 63/02; H04L 63/1416; H04L 67/1002
USPC ............... 709/220, 203, 230, 237, 224, 222; 370/329, 235, 400, 336, 225
See application file for complete search history.

(56) References Cited

U.S. PATENT DOCUMENTS

| | | | |
|---|---|---|---|
| 2003/0115259 A1* | 6/2003 | Lakshmi Narayanan | H04L 29/06 709/203 |
| 2004/0003111 A1* | 1/2004 | Maeda | H04L 45/02 709/237 |
| 2006/0250959 A1* | 11/2006 | Porat | H04L 45/02 370/230 |
| 2007/0156862 A1* | 7/2007 | Yamada | H04L 67/16 709/220 |
| 2010/0058329 A1 | 3/2010 | Durazzo et al. | |
| 2012/0117509 A1* | 5/2012 | Powell | G06F 17/30528 715/786 |
| 2012/0230282 A1* | 9/2012 | Wu | H04W 28/16 370/329 |
| 2013/0188493 A1* | 7/2013 | Numata | H04L 45/64 370/235 |
| 2013/0195112 A1* | 8/2013 | Morita | H04L 41/28 370/400 |
| 2013/0201821 A1* | 8/2013 | Yamato | H04L 41/0893 370/225 |
| 2013/0201970 A1* | 8/2013 | Fujita | H04W 72/0446 370/336 |
| 2014/0101301 A1* | 4/2014 | Wanser | H04L 43/04 709/224 |
| 2014/0115578 A1* | 4/2014 | Cooper | G06F 21/606 718/1 |
| 2016/0050612 A1* | 2/2016 | Axnas | H04W 40/24 370/329 |
| 2017/0230380 A1* | 8/2017 | Nguyen | H04L 63/105 |

FOREIGN PATENT DOCUMENTS

| | | |
|---|---|---|
| CN | 101814998 A | 8/2010 |
| CN | 102098349 A | 6/2011 |
| CN | 103491129 A | 1/2014 |
| EP | 2466815 A1 | 6/2012 |
| WO | 2008088954 A2 | 7/2008 |
| WO | 2012118711 A2 | 9/2012 |

OTHER PUBLICATIONS

Stewart, R., et al., "Aggregate Server Access Protocol (ASAP) and Endpoint Handlespace Redundancy Protocol (ENRP) Parameters," Network Working Group Request for Comments 5354, Sep. 2008, 23 pages.

* cited by examiner

METHOD FOR CONFIGURING SERVICE NODE, SERVICE NODE POOL REGISTRARS, AND SYSTEM

This application is a continuation of International Application No. PCT/CN2014/080106, filed on Jun. 17, 2014, which claims priority to Chinese Patent Application No. 201310283419.8, filed on Jul. 5, 2013, both of which are hereby incorporated by reference in their entireties.

TECHNICAL FIELD

The present disclosure relates to the field of communications technologies, and in particular, to a method for configuring a service node, service node pool registrars, and a system.

BACKGROUND

In a conventional data center, service nodes generally exist in a physical form, a quantity of the service nodes is limited, and locations of the service nodes are fixed; therefore, the service nodes are manually configured. However, network virtualization brings the following new requirements:

1. A virtualized multi-tenant requirement: Separation of tenants' services requires that each tenant network should have different types and quantities of service nodes.

2. Cloud interconnection of data centers: Multiple data centers are interconnected to form a virtual cloud data center, causing that a quantity of service nodes increases sharply, and a virtual service node can be deployed at any location.

3. After an original service node supported by special-purpose hardware is virtualized, the hardware with high performance is replaced by a virtual machine Due to the performance degradation, efficiency of the service node is reduced, a burden becomes heavier as tenants increase, and a fault or overload easily occurs.

In conclusion, after network functions are virtualized, a large quantity of service nodes need to be managed, and it becomes more complex to support reliability, high availability, and scalability of the service nodes; therefore, conventional manual configuration obviously cannot meet the requirements.

SUMMARY

To meet increasingly strong requirements for virtualization of network functions, embodiments of the present disclosure provide a method for configuring a service node, service node pool registrars, and a system.

According to a first aspect, a method for configuring a service node is provided, where the method includes:

receiving a service node query request sent by a management configuration device, where the service node query request includes a service requirement, where the service requirement is from a user or caused by a network change;

searching a service node database, to obtain service node information that matches the service node query request, where the matching service node information includes one or more of the following: an identifier, location information, and status information that are of a matching service node, a selection policy for the status information, a tenant identifier, and a service chain path that meets the service requirement; and sending the matching service node information to the management configuration device, so that the management configuration device performs network and service configuration on the matching service node according to network topology information that has been obtained and the matching service node information.

According to a second aspect, a service node pool registrar is provided, where the service node pool registrar includes:

a receiving module, configured to receive a service node query request sent by a management configuration device, where the service node query request includes a service requirement, where the service requirement is from a user or caused by a network change;

a search module, configured to search a service node database, to obtain service node information that matches the service node query request, where the matching service node information includes one or more of the following: an identifier, location information, and status information that are of a matching service node, a selection policy for the status information, a tenant identifier, and a service chain path that meets the service requirement; and a sending module, configured to send the matching service node information to the management configuration device, so that the management configuration device performs network and service configuration on the matching service node according to network topology information that has been obtained and the matching service node information.

According to a third aspect, a service node pool registrar is provided, where the service node pool registrar includes a transceiver, a processor, and a memory, where the memory is configured to store program code, where:

the transceiver is configured to receive a service node query request sent by a management configuration device, where the service node query request includes a service requirement, where the service requirement is from a user or caused by a network change;

the processor is configured to invoke the program code in the memory, to perform the following operation:

searching a service node database, to obtain service node information that matches the service node query request, where the matching service node information includes one or more of the following: an identifier, location information, and status information that are of a matching service node, a selection policy for the status information, a tenant identifier, and a service chain path that meets the service requirement; and the transceiver is further configured to send the matching service node information to the management configuration device, so that the management configuration device performs network and service configuration on the matching service node according to network topology information that has been obtained and the matching service node information.

According to a fourth aspect, a system for configuring a service node is provided, where the system includes the service node pool registrar according to either the foregoing second aspect or the foregoing third aspect and a management configuration device, where the management configuration device is configured to perform network and service configuration on a matching service node according to network topology information that has been obtained and the matching service node information.

In the embodiments of the present disclosure, a service node query request sent by a management configuration device is received, where the service node query request includes a service requirement, where the service requirement is from a user or caused by a network change; a service node database is searched, to obtain service node information that matches the service node query request, where the matching service node information includes one or more of the following: an identifier, location information, and status information that are of a matching service node, a selection policy for the status information, a tenant identifier, and a service chain path that meets the service requirement; and the matching service node information is sent to the management configuration device, so that the management configuration device performs network and service configuration on the matching service node according to network topology information that has been obtained and the matching service node information, which resolves a problem of automatic configuration and management of all service nodes in a scenario in which a network is virtualized and multiple tenants are supported, and improves reliability and load balance capabilities of the service nodes; and can optimize service path selection by means of direct internal integration, or seamless cooperation with an external path computation module.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

With reference to accompanying drawings in this specification, the following further describes the embodiments of the present disclosure in detail.

Figure 1:
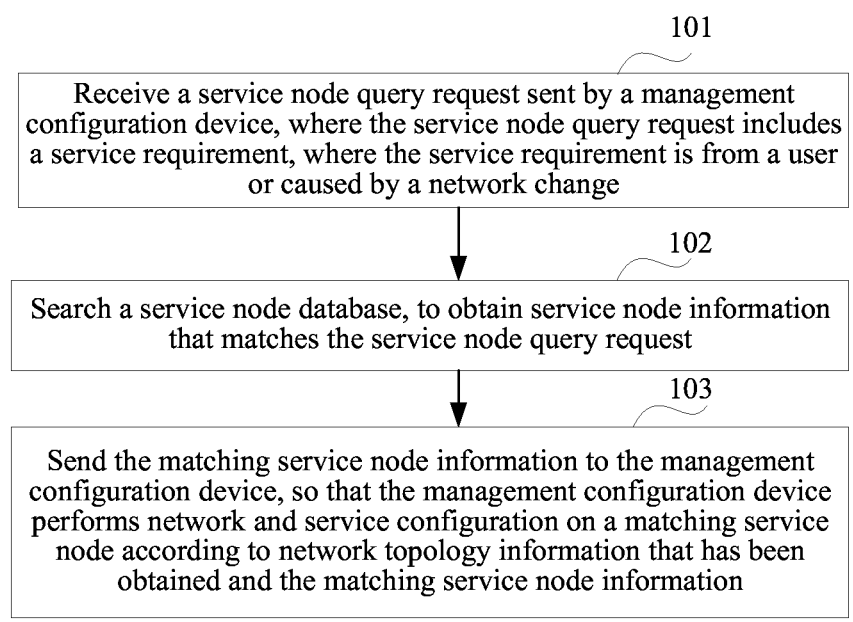
FIG. 1 is a flowchart of a method for configuring a service node according to an embodiment of the present disclosure.

In an embodiment of the present disclosure, a method for configuring a service node is designed. Referring to FIG. 1, the method includes the following steps.

Step 101. Receive a service node query request sent by a management configuration device, where the service node query request includes a service requirement, where the service requirement is from a user or caused by a network change.

Step 102. Search a service node database, to obtain service node information that matches the service node query request, where the matching service node information includes one or more of the following: an identifier, location information, and status information that are of a matching service node, a selection policy for the status information, a tenant identifier, and a service chain path that meets the service requirement.

Step 103. Send the matching service node information to the management configuration device, so that the management configuration device performs network and service configuration on the matching service node according to network topology information that has been obtained and the matching service node information.

The method of this embodiment of the present disclosure resolves a problem of automatic configuration and management of all service nodes in a scenario in which a network is virtualized and multiple tenants are supported, and improves reliability and load balance capabilities of the service nodes; and can optimize service path selection by means of direct internal integration, or seamless cooperation with an external path computation module.

Preferably, step 101 may be implemented in, but not limited to, the following manner.

The service node query request sent by the management configuration device is received by extending a protocol message of the Aggregate Server Access Protocol ASAP or defining a new message.

Preferably, the method further includes:

receiving a registration message or an update message or a deregistration message of the service node, to form a service node database.

Preferably, the registration message or the update message or the deregistration message of the service node is received by extending a protocol message of the Aggregate Server Access Protocol ASAP or defining a new message, to form the service node database.

Preferably, the method further includes:

performing keep-alive detection on a service node that has registered, monitoring a status of the service node that has registered, and performing troubleshooting, where specifically, the keep-alive detection includes a heartbeat mechanism, proactive reporting and processing of a fault on a service node, and the like, which are not limited in this embodiment of the present disclosure, and are all within the protection scope of this embodiment of the present disclosure.

Preferably, the method further includes:

synchronizing the registration message or the update message or the deregistration message of the service node with the management configuration device.

Preferably, the registration message or the update message or the deregistration message of the service node is synchronized with the management configuration device by extending a protocol message of the Aggregate Server Access Protocol ASAP or defining a new message.

Preferably, the service node is a virtual service node.

Preferably, the service node includes a virtual firewall (Vfw), a virtual load balancer (Vlb), a virtual wide area network optimization controller (vWoC), a virtual intrusion detection system/a virtual intrusion prevention system (Vids)/(Vips), or a virtual network address translation (vNAT).

Preferably, the service node query request is relocation of the service node, and the method specifically includes:

receiving the service node query request sent by the management configuration device, where the service node query request includes a constraint of relocation of the service node;

searching the service node database, to obtain the service node information that matches the service node query request, where the matching service node information includes an identifier and location information of a source node that meets the constraint and an identifier and location information of a destination node that meets the constraint; and sending the matching service node information to the management configuration device, so that the management configuration device instructs, according to the network topology information that has been obtained and the matching service node information, the matching source node to perform a deregistration operation, and activates and enables the matching destination node to serve the user.

Preferably, the management configuration device is responsible for collating various service requirements from a user or caused by a network change together, and sending a service node query request to a service node pool registrar, to apply for a service node that meets a requirement. An interface between the management configuration device and the service node pool registrar may extend an ASAP_HANDLE_RESOLUTION message and an ASAP_HANDLE_RESOLUTION_RESPONSE message in the Aggregate Server Access Protocol, to newly add some TLVs, or define a new message type (for example, transmit specific requirements of various service nodes by using an XML format extension message and by using an XMPP Protocol), for carrying specific requirements of different service nodes, including: location information, tenant information, functions of the service nodes, specifications and attributes of performance of the service nodes, and the like.

The service node pool registrar searches the service node database, to obtain the service node information that matches the service node query request, where the matching service node information includes one or more of the following: an identifier, location information, and status information that are of a matching service node, a selection policy for the status information, a tenant identifier, and a service chain path that meets the service requirement. If a path computation module is built in the service node pool registrar, the path computation module can directly calculate a service chain path, and return the service chain path to the management configuration device.

The service node pool registrar sends the matching service node information to the management configuration device, so that the management configuration device performs network and service configuration on a matching service node according to network topology information that has been obtained and the matching service node information. Specifically, if no path computation module is built in the service node pool registrar, the management configuration device calculates an optimized service chain path according to the network topology information that has been obtained and the matching service node information by using a path computation module.

Preferably, the service node pool registrar may be designed as distributed, and there may be multiple service node pool registrars that synchronize with each other information about service nodes that have registered, thereby implementing redundant backup.

In an example, for a firewall FW service node, content of an extended message of the service node is defined as follows:

a manner of extending a TLV:

a type attribute of the TLV may be within a value range except types that have been defined by RFC 5354;

content included in the TLV briefly includes the following: an id, a name, a type, a tenant id, and a resource requirement and a service attribute of the service node;

a service type may include: a firewall FW, a virtual load balancer vLB, a wide area network optimization controller WoC, an intrusion detection system/intrusion prevention system IDS/IPS, a network address translation NAT, or the like;

an attribute included in a resource requirement includes: cpu, memory, storage, bandwidth, interface, or the like; and an attribute included in a service attribute includes: pre_hop, next_hop, capability, or the like, where pre_hop and next_hop are mainly used to organize a service node chain, and for capability, there are specific definitions for different specific types of service nodes.

An XML extended message format of the XMPP Protocol is:

```
<message to='NFVPool Registrar' from='Provision system'>
    <items='NFV-information-model'>
        <id>'100'</id>
        < name >'FW1'</ name >
        < service-type >'FW'</ service-type >
        < tenant-id >'168'</ tenant-id >
        <item='resource requirement' >
            <cpu>'4000000000'</cpu>
            < memory >'16000000000'</ memory >
            < storage >'500000000000'</ storage >
        < bandwidth >'1000000000'</ bandwidth >
        < interface>'Ethernet GE'</ interface>
        </item>
        <item='service attribute' >
        ...
        < pre_hop >'10.10.10.9'</ pre_hop >
        < next_hop >'10.10.10.11'</ next_hop >
        ...
        </item>
    </items>
</message>
```

After being successfully created, each service node needs to register with the service node pool registrar in time, and after performing deregistration and attribute update, the service node also needs to notify the service node pool registrar of the deregistration and attribute update in time. An interface between the service node and the service node pool registrar is extended, or a message (including: ASAP_REGISTRATION, ASAP_DEREGISTRATION, ASAP_REGISTRATION_RESPONSE, ASAP_DEREGISTRATION_RESPONSE, ASAP_ENDPOINT_KEEP_ALIVE, ASAP_ENDPOINT_KEEP_ALIVE_ACK, ASAP_ENDPOINT_UNREACHABLE, or ASAP_SERVER_ANNOUNCE), for communication between the two in the ASAP Protocol, or the like may also be extended, to newly add some TLVs, or define a brand new message type (for example, transmit specific requirements of various service nodes by using an XML format extension message and by using the XMPP Protocol), for carrying newly added attribute information of different service nodes, including: tenant information, functions of the service nodes, specifications and attributes of performance of the service nodes, and the like.

Figure 2:
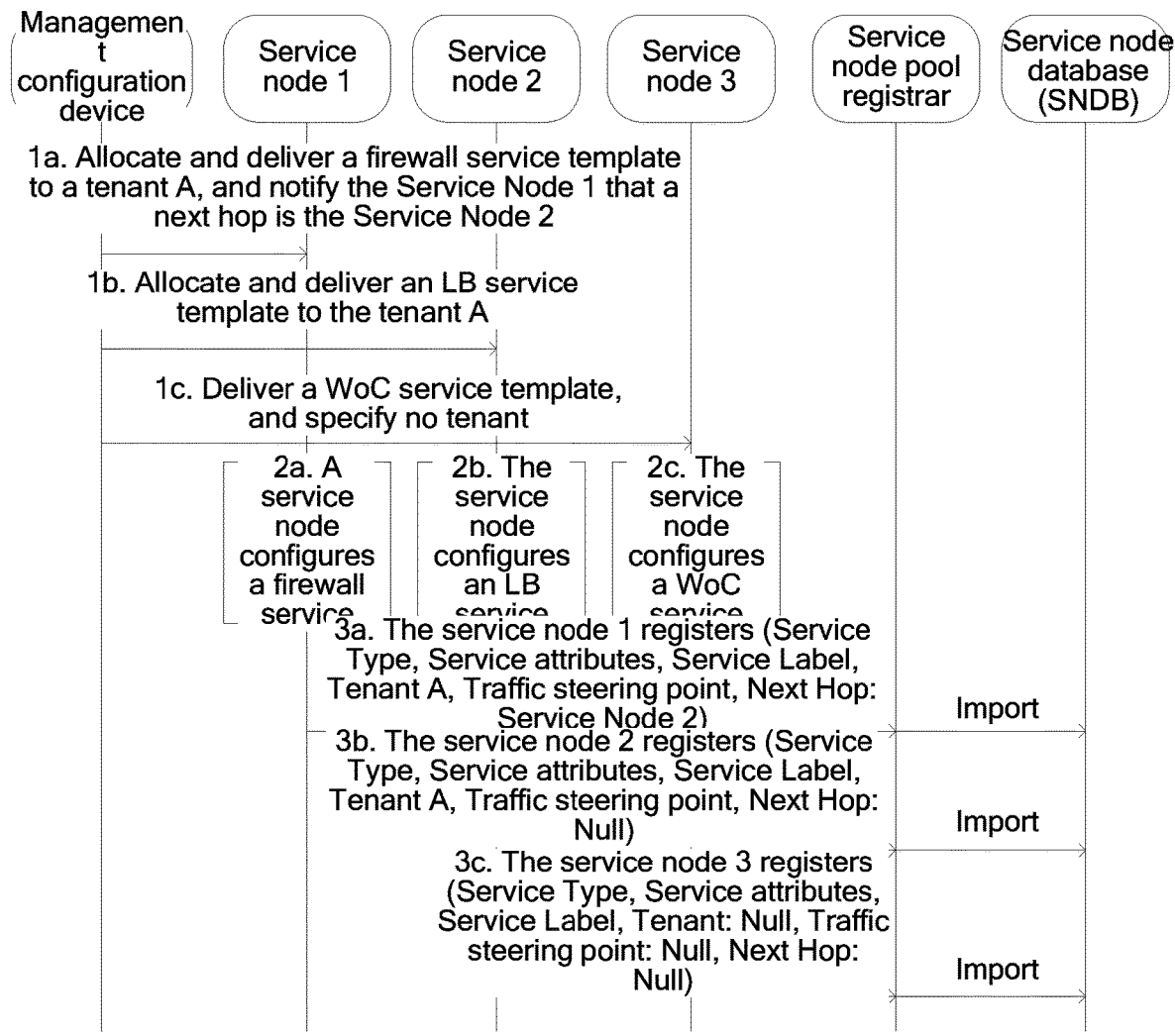
FIG. 2 is a schematic diagram of a processing procedure of registration of a service node according to an embodiment of the present disclosure.

With reference to FIG. 2, the following describes exemplary Embodiment 1 of the present disclosure. A processing procedure of registration of a service node is as follows:

Each service node in this embodiment of the present disclosure is a successfully created service node (for example, a vFW, or a vLB), and a related functional template of the service node is delivered by a management configuration device. For example, in step 1*a* in the figure, a firewall service template is allocated and delivered to a tenant A, and a Service Node 1 is notified that a next hop is a Service Node 2, in 1*b*, an LB service template is allocated and delivered to the tenant A, and in 1*c*, a WoC service template is delivered, and no tenant is specified.

The service node configures corresponding functions. For example, in step 2*a* in the figure, the service node configures a firewall service, in 2*b*, the service node configures an LB service, and in 2*c*, the service node configures a WoC service.

After the service node is successfully created, the service node registers with a service node pool registrar, to become a part of an available service node database. For example, in step 3*a* in the figure, the service node 1 registers (Service Type, Service attributes, Service Label, Tenant A, Traffic steering point, Next Hop: Service Node 2), in 3*b*, the service node 2 registers (Service Type, Service attributes, Service Label, Tenant A, Traffic steering point, Next Hop: Null), and in 3*c*, a service node 3 registers (Service Type, Service attributes, Service Label, Tenant: Null, Traffic steering point: Null, Next Hop: Null).

Figure 3:
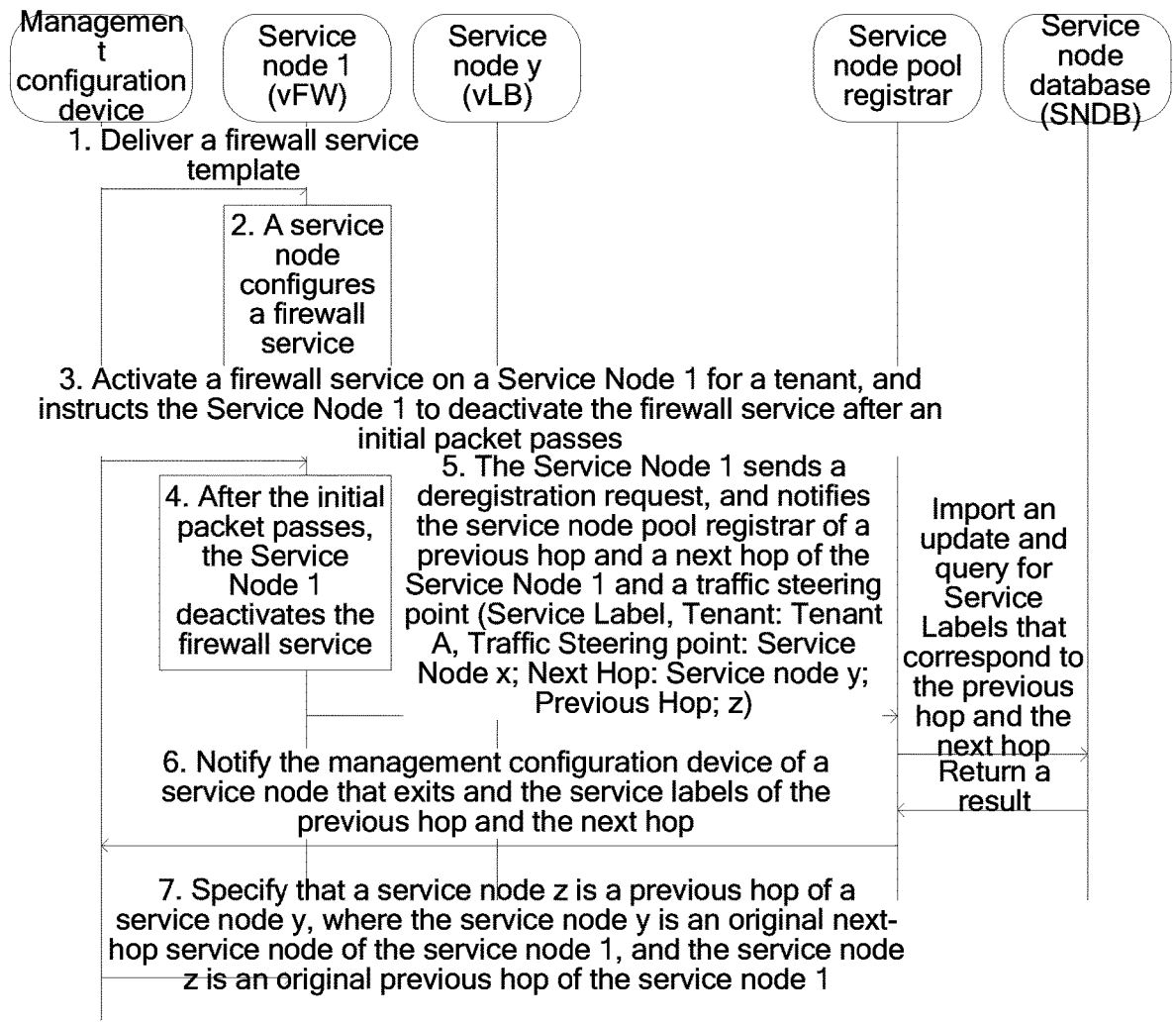
FIG. 3 is a schematic diagram of a procedure in which a firewall service node performs deregistration after an initial packet passes according to an embodiment of the present disclosure.

With reference to FIG. 3, the following describes exemplary Embodiment 2 of the present disclosure. A procedure in which a firewall service node performs deregistration after an initial packet passes is as follows:

A function of passing of an initial packet supported by a firewall mainly refers to: After the initial packet passes, it is determined that a message of such type of forwarding information meets a requirement, and therefore, a forwarding entry is directly delivered to a forwarding device, so that a subsequent packet with a same forwarding attribute can directly pass, without being processed by the firewall, which improves processing efficiency.

To deregister a service node, a deregistration message needs to be sent to the service node pool registrar, and identifier information of previous-hop and next-hop service nodes of the service node needs to be attached, to update related content in the service node database.

Finally, the management configuration device needs to be further notified, to modify a precedence relationship of a service node chain.

Specific steps are the following:

1. The management configuration device delivers a firewall service template.

2. The service node configures a firewall service.

3. The management configuration device activates a firewall service on Service Node 1 for a tenant, and instructs the Service Node 1 to deactivate the firewall service after an initial packet passes.

4. After the initial packet passes, the Service Node 1 deactivates the firewall service.

5. The Service Node 1 sends a deregistration request, and notifies the service node pool registrar of a previous hop and a next hop of the Service Node 1 and a traffic steering point with (Service Label, Tenant: Tenant A, Traffic Steering point: Service Node x; Next Hop: Service node y; Previous Hop; z).

The service node pool registrar imports an update into the service node database and queries for service labels that correspond to the previous hop and the next hop.

6. The service node pool registrar notifies the management configuration device of a service node that exits and the service labels of the previous hop and the next hop.

7. The management configuration device specifies that a service node z is a previous hop of a service node y, where the service node y is an original next-hop service node of the service node 1, and the service node z is an original previous hop of the service node 1.

Figure 4:
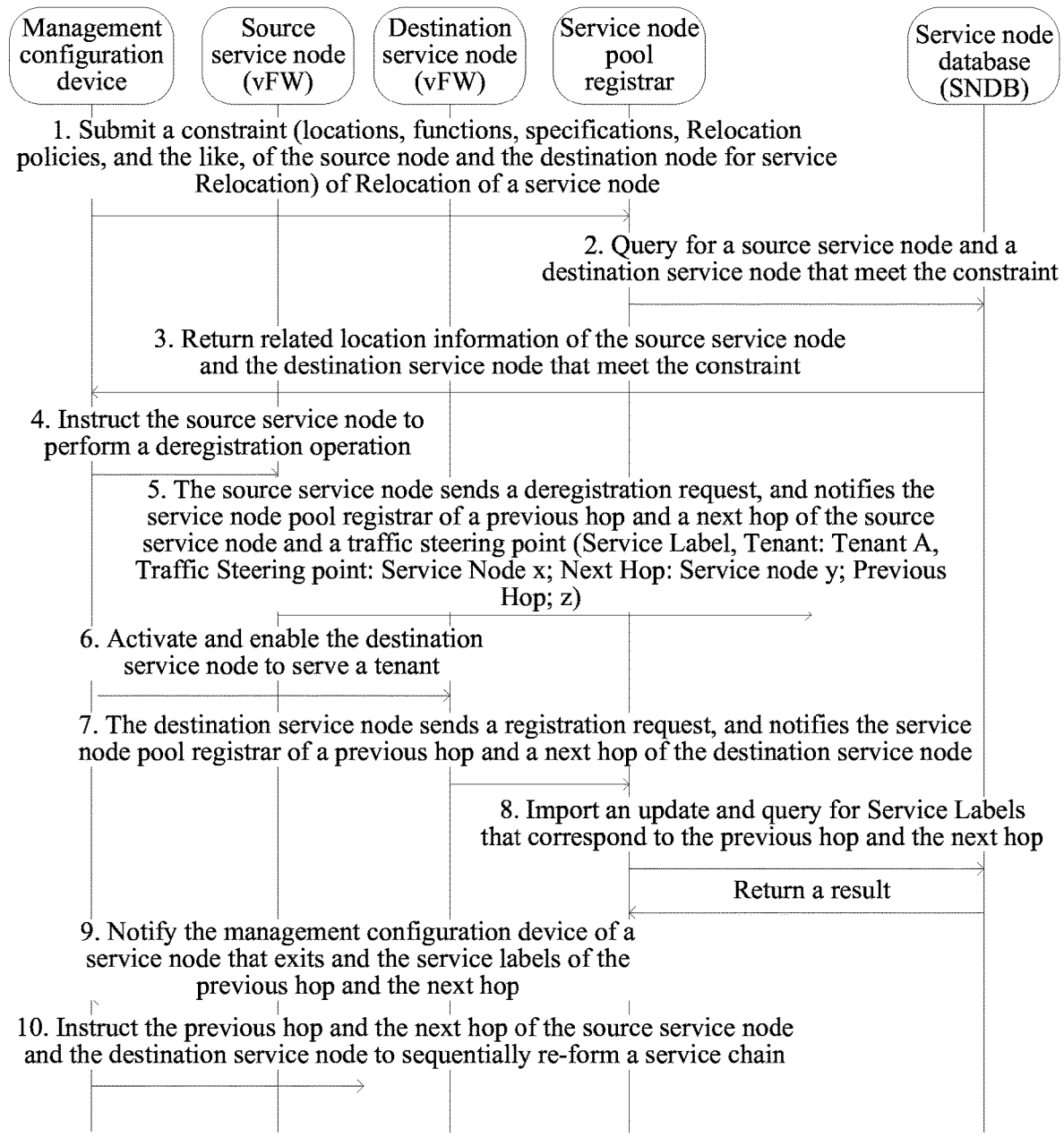
FIG. 4 is a schematic diagram of a processing procedure of relocation of a service node according to an embodiment of the present disclosure.

With reference to FIG. 4, the following describes exemplary Embodiment 3 of the present disclosure. A processing procedure of relocation of a service node is as follows:

In terms of the relocation of the service node, the most important is to query the service node database of the service node pool registrar according to a constraint of the relocation, for a source service node and a destination service node that meet the constraint.

If two corresponding services can be found, subsequent operations are deregistration and release of the source service node, creation and update of the destination service node, and update of a service node chain.

Specific steps are as follows.

1. A management configuration device submits a constraint (locations, functions, specifications, relocation policies, and the like, of the source node and the destination node for service relocation) of relocation of the service node.

2. The service node pool registrar queries for a source service node and a destination service node that meet the constraint.

3. The service node pool registrar returns, to the management configuration device, related location information of the source service node and the destination service node that meet the constraint.

4. The management configuration device instructs the source service node to perform a deregistration operation.

5. The source service node sends a deregistration request to the service node pool registrar, and notifies the service node pool registrar of a previous hop and a next hop of the source service node and a traffic steering point with (Service Label, Tenant: Tenant A, Traffic Steering point: Service Node x; Next Hop: Service node y; Previous Hop; z).

6. The management configuration device activates and enables the destination service node to serve a tenant.

7. The destination service node sends a registration request to the service node pool registrar, and notifies the service node pool registrar of a previous hop and a next hop of the destination service node.

8. The service node pool registrar imports an update into the service node database and queries for service labels that correspond to the previous hop and the next hop.

9. The service node pool registrar notifies the management configuration device of a service node that exits and the service labels of the previous hop and the next hop.

10. The management configuration device instructs the previous hop and the next hop of the source service node and the destination service node to sequentially re-form a service chain.

Figure 5:
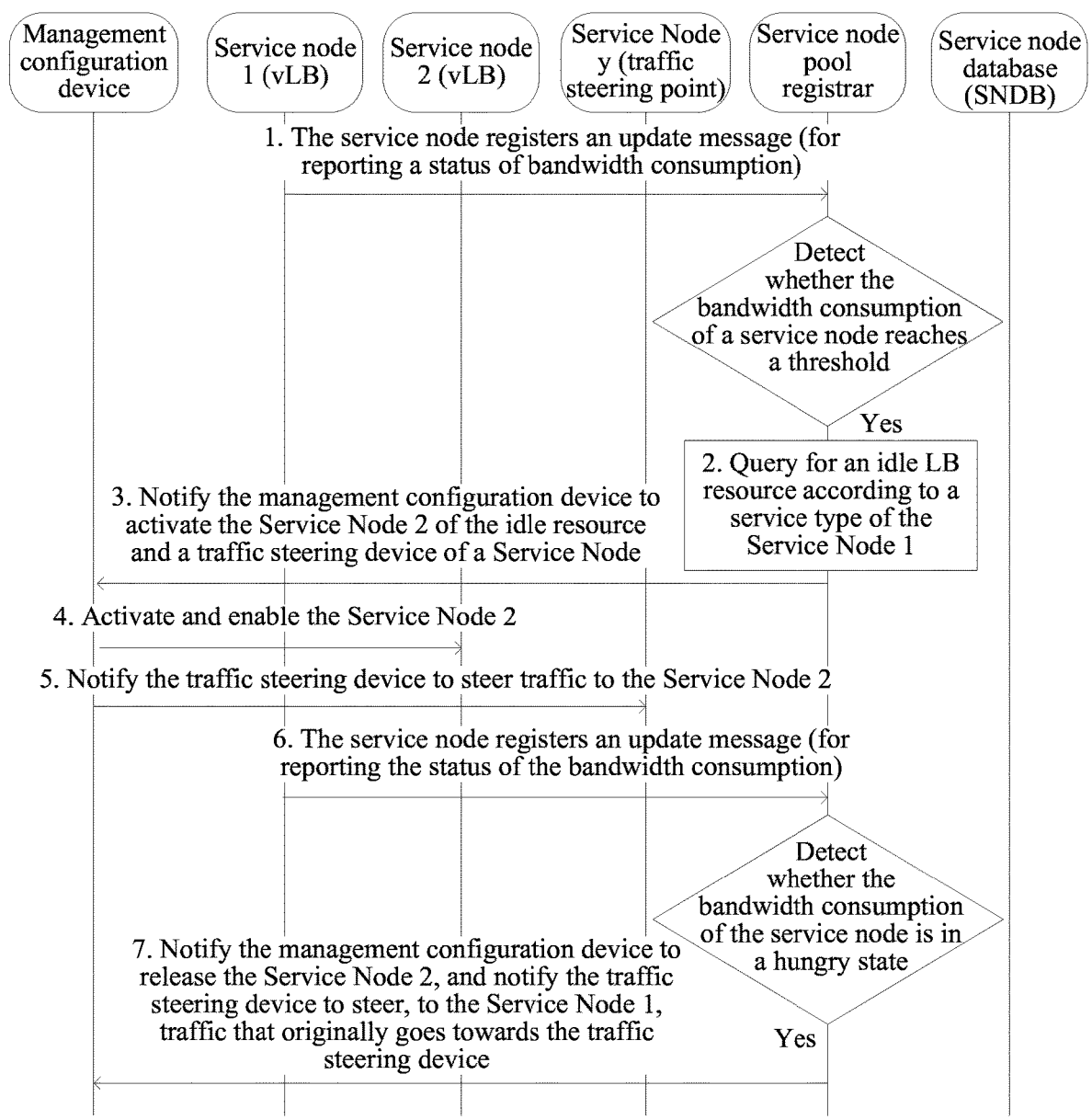
FIG. 5 is a schematic diagram of a processing procedure of scaling (including scaling out and scaling in) of a service node according to an embodiment of the present disclosure.

Within reference to FIG. 5, the following describes exemplary Embodiment 4 of the present disclosure. A processing procedure of scaling (including scaling out and scaling in) of a service node is as follows:

When a resource status of a service node changes, the service node immediately sends a registration update message to a service node pool registrar, to notify the service node pool registrar of the change of the resource status of the service node. For example, when resources are insufficient, the service node needs to instruct the service node pool registrar to allocate a new service node resource for support, and then instruct a management configuration device to deploy and load the new resource. On the contrary, when current resources are sufficient, if a hungry state of bandwidth consumption of the service node occurs, the service node also needs to notify a related system to release a redundant resource.

Specific steps are as follows.

1. The service node registers an update message (for reporting a status of bandwidth consumption) in the service node pool registrar.

The service node pool registrar detects whether the bandwidth consumption reaches a threshold; if the bandwidth consumption reaches the threshold, perform step 2.

2. The service node pool registrar queries for an idle LB resource according to a service type of a Service Node 1.

3. The service node pool registrar notifies the management configuration device to activate a Service Node 2 of the idle resource and a traffic steering device of a Service Node.

4. The management configuration device activates and enables the Service Node 2.

5. The management configuration device notifies the traffic steering device to steer traffic to the Service Node 2.

6. The service node 1 registers an update message (for reporting a status of bandwidth consumption) in the service node pool.

The service node pool registrar detects whether the bandwidth consumption of Service Node 1 is in a hungry state; if the bandwidth consumption of Service Node 1 is in the hungry state, perform step 7.

7. The service node pool registrar notifies the management configuration device to release the Service Node 2, and notifies the traffic steering device to steer, to the Service Node 1, traffic that originally goes towards the traffic steering device.

Figure 6:
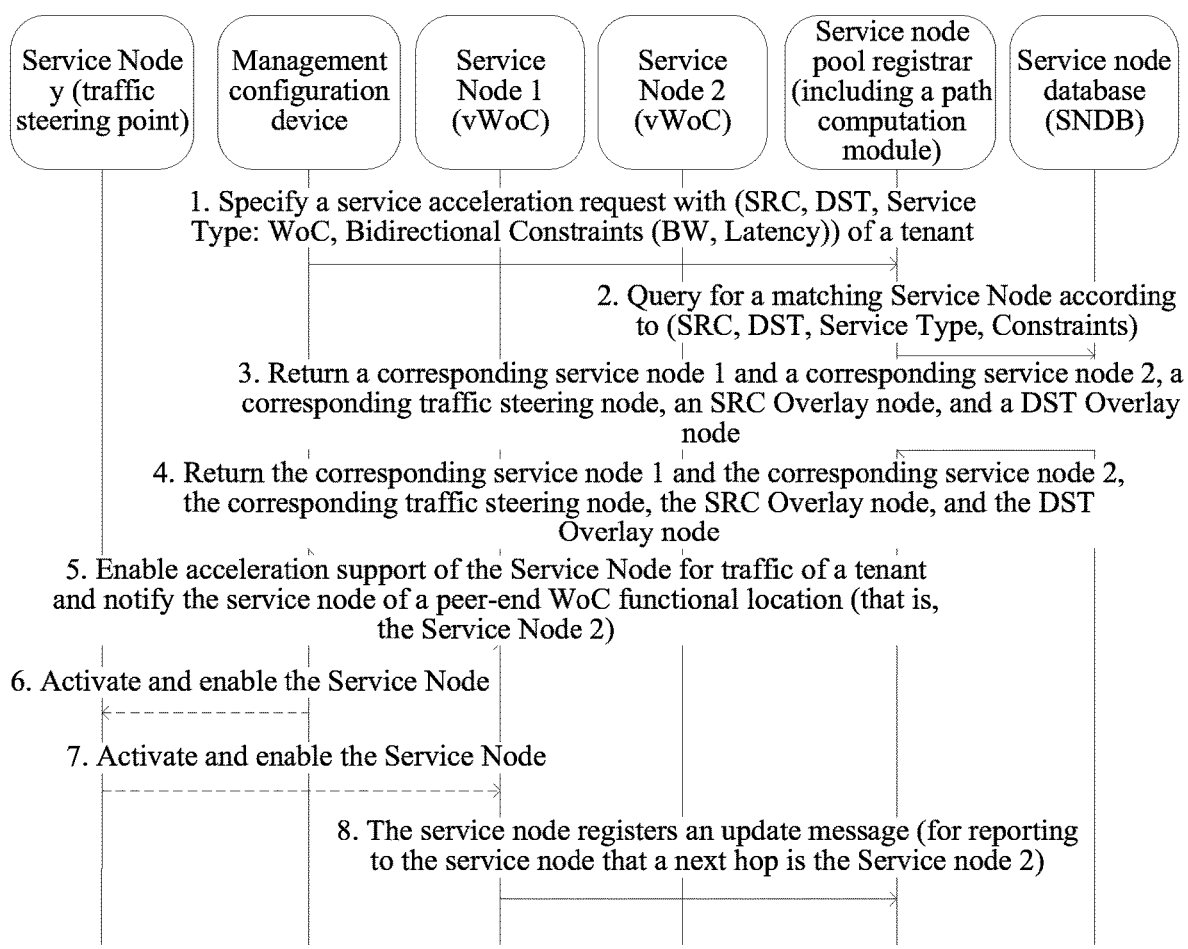
FIG. 6 is a schematic diagram of a processing procedure of an implementation of E2E relocation by using a path computation module according to an embodiment of the present disclosure.

With reference to FIG. 6, the following describes exemplary Embodiment 5 of the present disclosure. A processing procedure of an implementation of end-to-end E2E relocation by using a path computation module is as follows:

When the path computation module is integrated into a service node pool registrar, the path computation module has a comprehensive path computation capability, and can establish, according to a source address, a destination address, and some constraints, a forwarding path between endpoints that meet a constraint, where establishment of an overlay tunnel is even included.

The function is an advanced function of automatic configuration of a service node, involving management of a service chain that includes two or more service nodes.

Specific steps are as follows.

1. A service node 1 specifies a service acceleration request with (SRC, DST, Service Type: WoC, Bidirectional Constraints (BW, Latency)) of a tenant for the service node pool registrar that includes a path computation module.

2. The service node pool registrar queries for a matching Service Node according to (SRC, DST, Service Type, Constraints).

3. A service node database returns, to the service node pool registrar, a corresponding service node 1 and a corresponding service node 2, a corresponding traffic steering node, an SRC Overlay node, and a DST Overlay node.

4. The service node pool registrar returns, to a management configuration device, the corresponding service node 1 and the corresponding service node 2, the corresponding traffic steering node, the SRC Overlay node, and the DST Overlay node.

5. The management configuration device enables acceleration support of the Service Node for traffic of a tenant and notifies the service node of a peer-end WoC functional location (that is, the Service Node 2).

6. The management configuration device activates and enables the Service Node.

7. A traffic steering device activates and enables the Service Node.

8. The service node 1 registers an update message (for reporting to the service node that a next hop is the Service node 2) in the service node pool.

Figure 7:
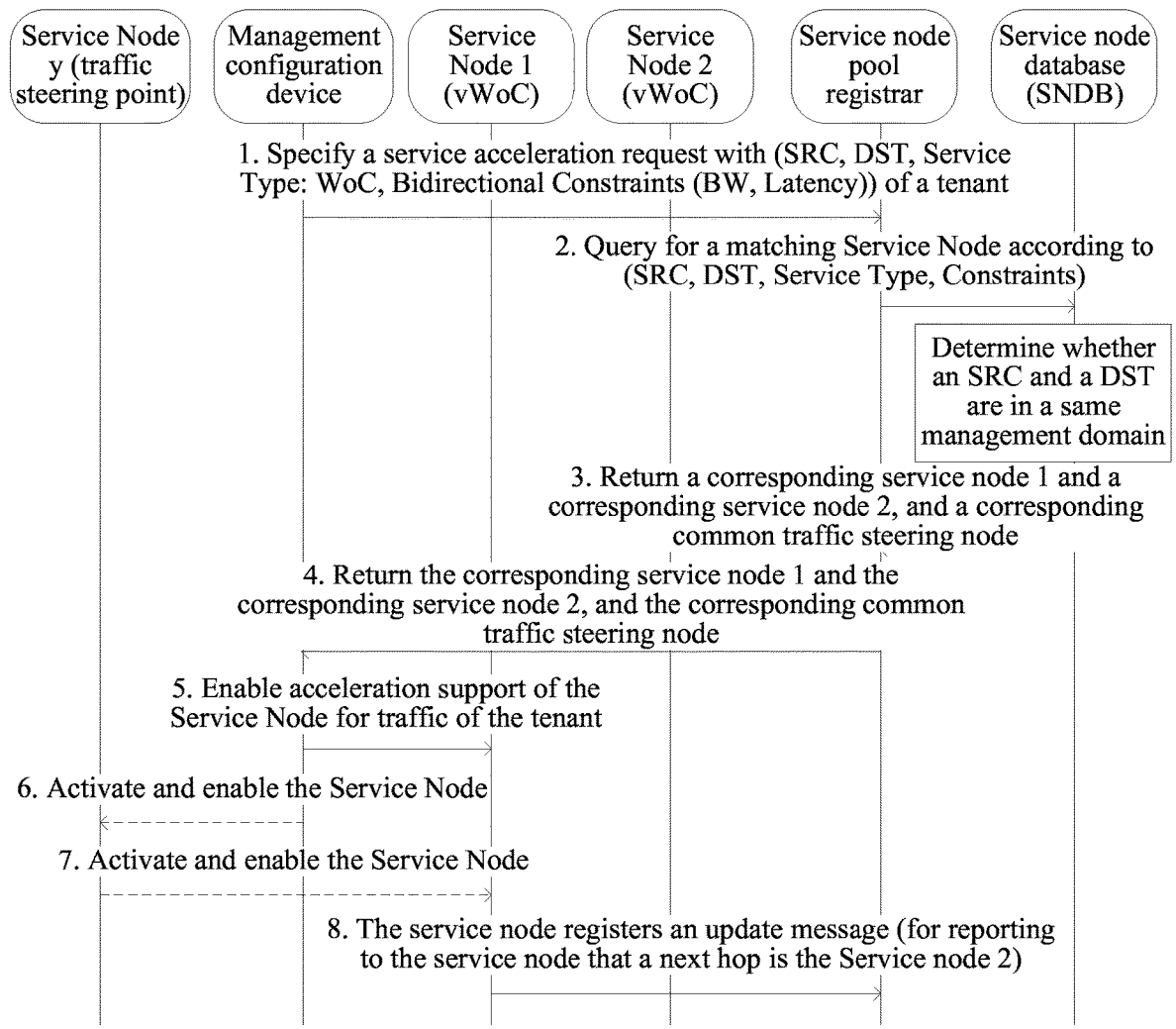
FIG. 7 is a schematic diagram of a processing procedure of deployment of a service node without using a path computation module according to an embodiment of the present disclosure.

With reference to FIG. 7, the following describes exemplary Embodiment 6 of the present disclosure. A processing procedure of deployment of a service node without using a path computation module is as follows:

When a source address and a destination address are in a same management domain, automatic configuration of service nodes at two ends are relatively simple, and complex path computation or tunnel establishment is not needed, as long as location information of the nodes at the two ends is found.

Specific steps are as follows.

1. A management configuration device specifies a service acceleration request with (SRC, DST, Service Type: WoC, Bidirectional Constraints (BW, Latency)) of a tenant for a service node pool registrar.

2. The service node pool registrar queries for a matching Service Node according to (SRC, DST, Service Type, Constraints).

A service node database determines whether a source service node SRC and a destination service node DST are in a same management domain; if the source service node SRC and the destination service node DST are in the same management domain, perform step 3.

3. A service node database returns, to the service node pool registrar, a corresponding service node 1 and a corresponding service node 2, and a corresponding common traffic steering node.

4. The service node pool registrar returns, to the management configuration device, the corresponding service node 1 and the corresponding service node 2, and the corresponding common traffic steering node.

5. The management configuration device enables acceleration support of the Service Node for traffic of a tenant.

6. The management configuration device activates and enables the Service Node.

7. A traffic steering device activates and enables the Service Node.

8. The service node 1 registers an update message (for reporting to the service node that a next hop is the Service node 2) in the service node pool.

Figure 8:
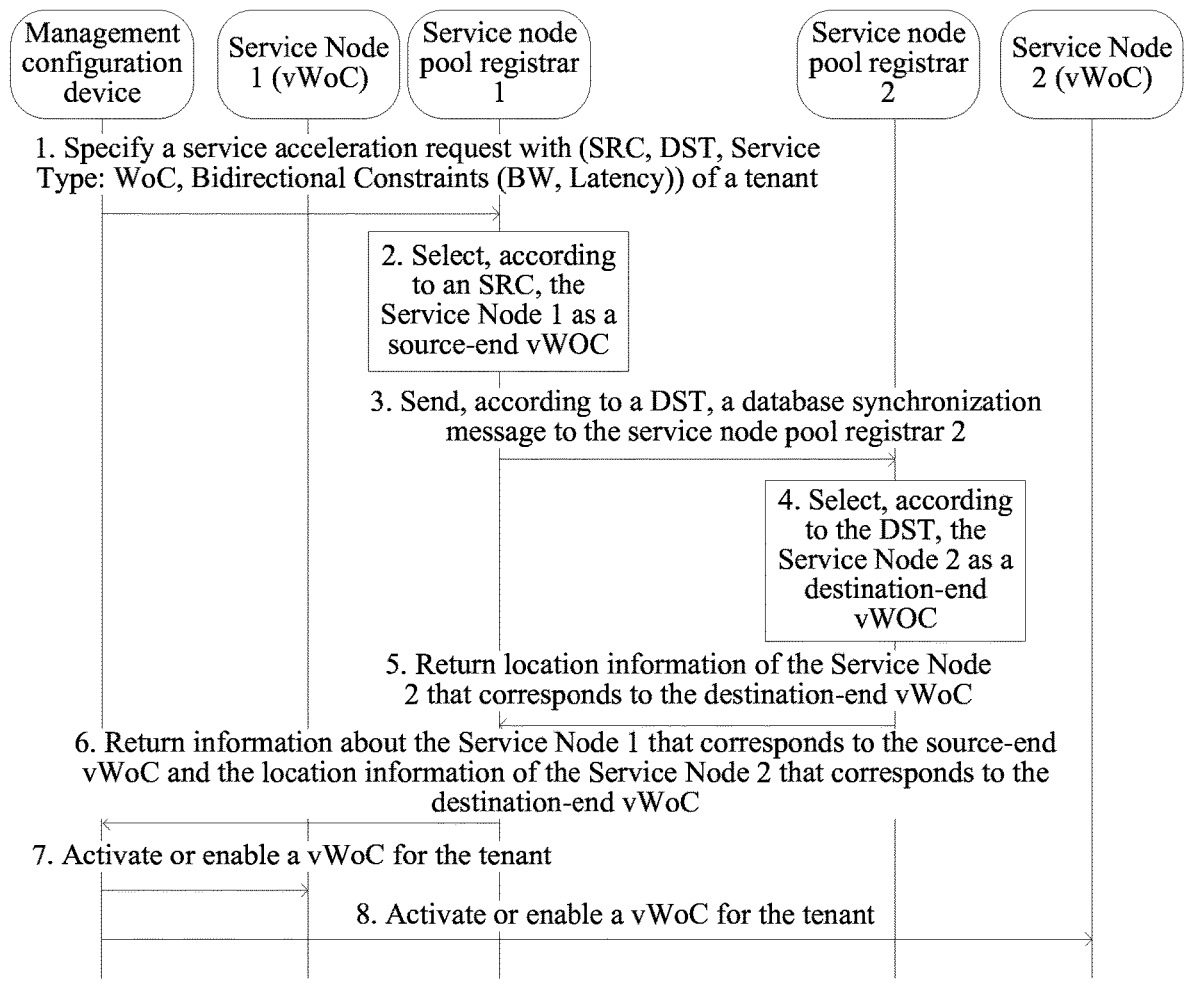
FIG. 8 is a schematic diagram of a procedure of coordination and synchronization among distributed service node pool registrars in a service node location scenario according to an embodiment of the present disclosure.

With reference to FIG. 8, the following describes exemplary Embodiment 7 of the present disclosure. A procedure of coordination and synchronization among distributed service node pool registrars in a service node location scenario is as follows:

When management of multiple service nodes involves multiple service node pool registrars, all the related service node pool registrars need to be coordinated for processing, and messages need to be synchronized among the service node pool registrars.

Specific steps are as follows.

1. A management configuration device specifies a service acceleration request with (SRC, DST, Service Type: WoC, Bidirectional Constraints (BW, Latency)) of a tenant for a service node pool registrar 1.

2. The service node pool registrar 1 selects, according to an SRC, a Service Node 1 as a source-end vWoC.

3. The service node pool registrar 1 sends, according to a DST, a database synchronization message to a service node pool registrar 2.

4. The service node pool registrar 2 selects, according to a DST, a Service Node 2 as a destination-end vWoC.

5. The service node pool registrar 2 returns, to the service node pool registrar 1, location information of the Service Node 2 that corresponds to the destination-end vWoC.

6. The service node pool registrar 1 returns, to the management configuration device, information about the Service Node 1 that corresponds to the source-end vWoC and the location information of the Service Node 2 that corresponds to the destination-end vWoC.

7. The management configuration device activates or enables a vWoC on the Service Node 1 for a tenant.

8. The management configuration device activates or enables a vWoC on the Service Node 2 for the tenant.

Figure 9:
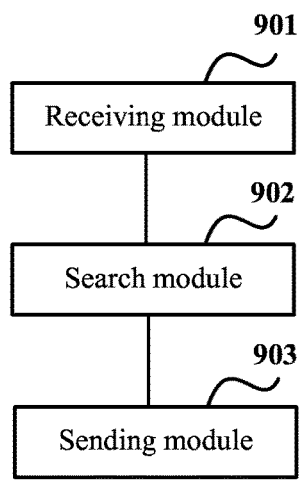
FIG. 9 is a schematic structural diagram of a service node pool registrar according to an embodiment of the present disclosure.

Based on a same design idea, an embodiment of the present disclosure further provides a service node pool registrar. Referring to FIG. 9, the service node pool registrar includes:

a receiving module 901, configured to receive a service node query request sent by a management configuration device, where the service node query request includes a service requirement, where the service requirement is from a user or caused by a network change;

a search module 902, configured to search a service node database, to obtain service node information that matches the service node query request, where the matching service node information includes one or more of the following: an identifier, location information, and status information that are of a matching service node, a selection policy for the status information, a tenant identifier, and a service chain path that meets the service requirement; and a sending module 903, configured to send the matching service node information to the management configuration device, so that the management configuration device performs network and service configuration on the matching service node according to network topology information that has been obtained and the matching service node information.

Preferably, the receiving module 901 is specifically configured to:

receive, by extending a protocol message of the Aggregate Server Access Protocol ASAP or defining a new message, the service node query request sent by the management configuration device.

Preferably, the receiving module 901 is further configured to:

receive a registration message or an update message or a deregistration message of the service node, to form a service node database.

Preferably, the receiving module 901 is specifically configured to:

receive the registration message or the update message or the deregistration message of the service node by extending a protocol message of the Aggregate Server Access Protocol ASAP or defining a new message, to form the service node database.

Preferably, the service node pool registrar further includes:

a maintenance module, configured to perform keep-alive detection on a service node that has registered, monitor a status of the service node that has registered, and perform troubleshooting.

Preferably, the service node pool registrar further includes:

a synchronization module, configured to synchronize the registration message or the update message or the deregistration message of the service node with the management configuration device.

Preferably, the synchronization module is specifically configured to synchronize the registration message or the update message or the deregistration message of the service node with the management configuration device by extending a protocol message of the Aggregate Server Access Protocol ASAP or defining a new message.

Figure 10:
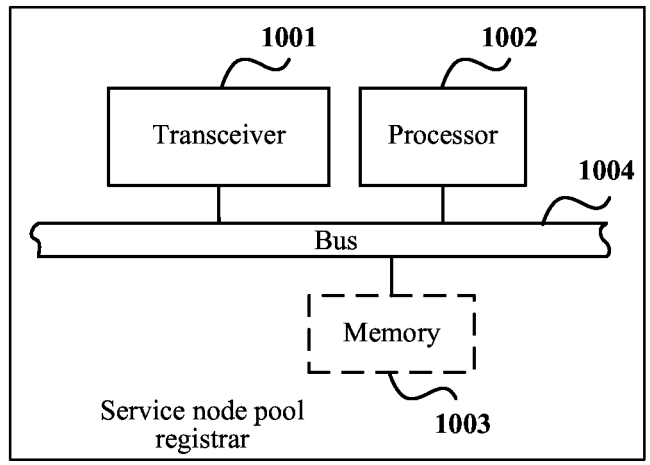
FIG. 10 is a schematic structural diagram of another service node pool registrar according to an embodiment of the present disclosure.

An embodiment of the present disclosure further provides a service node pool registrar, which, referring to FIG. 10, includes: a transceiver 1001, a processor 1002, a memory 1003, and a bus 1004, where the transceiver 1001, the processor 1002, and the memory 1003 are connected and communicate with each other by using the bus 1004.

The bus 1004 may be an industry standard architecture (ISA) bus, a peripheral component interconnect (PCI) bus, an extended industry standard architecture (EISA) bus, or the like. The bus 1004 may be an address bus, a data bus, a control bus, or the like. For ease of description, the bus is indicated only by a line in the figure, which does not indicate that there is only one bus or one type of bus.

The memory 1003 is configured to store program code, where the program code includes an operation instruction. The memory 1003 may include a high-speed random access memory (RAM), or may include a non-volatile memory, such as a magnetic disk storage.

The processor 1002 may be a central processing unit (CPU), or an application-specific integrated circuit (ASIC), or is configured as one or more integrated circuits implementing this embodiment of the present disclosure.

The transceiver 1001 is mainly configured to receive a service node query request sent by a management configuration device, where the service node query request includes a service requirement, where the service requirement is from a user or caused by a network change.

The processor 1002 is configured to invoke the program code in the memory 1003, to perform the following operation:

searching a service node database, to obtain service node information that matches the service node query request, where the matching service node information includes one or more of the following: an identifier, location information, and status information that are of a matching service node, a selection policy for the status information, a tenant identifier, and a service chain path that meets the service requirement; and the transceiver 1001 is further configured to send the matching service node information to the management configuration device, so that the management configuration device performs network and service configuration on the matching service node according to network topology information that has been obtained and the matching service node information.

Preferably, the transceiver 1001 is further configured to receive a registration message or an update message or a deregistration message of the service node, to form a service node database.

Figure 11:
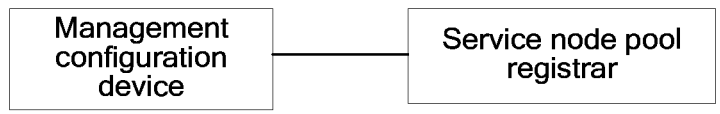
FIG. 11 is a schematic structural diagram of a system for configuring a service node according to an embodiment of the present disclosure.
Figure 12:
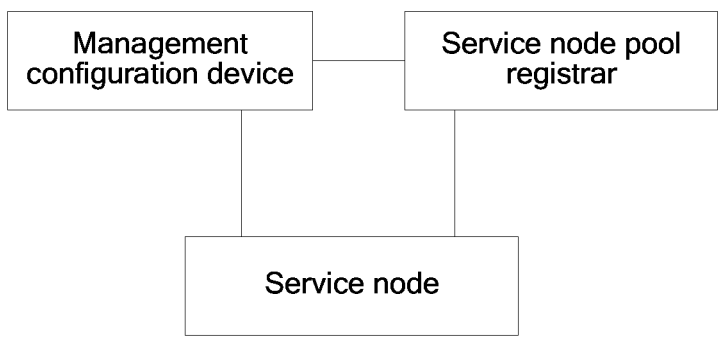
FIG. 12 is a schematic structural diagram of another system for configuring a service node according to an embodiment of the present disclosure.

An embodiment of the present disclosure further provides a system for configuring a service node, which, as shown in FIG. 11, includes the foregoing service node pool registrar described and a management configuration device, where the management configuration device is configured to perform network and service configuration on a matching service node according to network topology information that has been obtained and the matching service node information.

As shown in 12, the system for configuring a service node further includes a service node, configured to send a registration message or an update message or a deregistration message of the service node to the service node pool registrar, to form a service node database.

In the embodiments of the present disclosure, a service node query request sent by a management configuration device is received, where the service node query request includes a service requirement, where the service requirement is from a user or caused by a network change; a service node database is searched, to obtain service node information that matches the service node query request, where the matching service node information includes one or more of the following: an identifier, location information, and status information that are of a matching service node, a selection policy for the status information, a tenant identifier, and a service chain path that meets the service requirement; and the matching service node information is sent to the management configuration device, so that the management configuration device performs network and service configuration on the matching service node according to network topology information that has been obtained and the matching service node information, which resolves a problem of automatic configuration and management of all service nodes in a scenario in which a network is virtualized and multiple tenants are supported, and improves reliability and load balance capabilities of the service nodes; and can optimize service path selection by means of direct internal integration, or seamless cooperation with an external path computation module.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
receiving, by a service node pool registrar and from a management configuration device, a service node query request, wherein the service node query request comprises a service requirement for configuring a first service node of a plurality of service nodes, wherein the service requirement is from a user or is caused by a network change, and wherein the service node pool registrar, the management configuration device, and the plurality of service nodes are part of a virtualized network that supports a plurality of tenants;
forming, by the service node pool registrar, a service node database by receiving a first message from a second service node of the plurality of service nodes, wherein the first message comprises one or more of a registration message, an update message, and a deregistration message;
searching, by the service node pool registrar, the service node database to obtain first service node information that meets the service requirement, wherein the first service node information comprises an identifier of the first service node, location information for the first service node, status information of the first service node, a selection policy for the status information of the first service node, and a tenant identifier;
calculating, by the service node pool registrar, a service chain path according to the first service node information, wherein the service chain path indicates a forwarding path between the first service node and another service node of the plurality of service nodes;
sending, by the service node pool registrar to the management configuration device, the first service node information and the service chain path, causing the management configuration device to apply network and service configuration to the first service node according to the first service node information and the service chain path;
performing, by the service node pool registrar, keep-alive detection on the second service node, wherein the second service node is registered in the service node database;
monitoring, by the service node pool registrar, a status of the second service node; and
reporting and processing of a fault on the second service node.

2. The method according to claim 1, wherein receiving the first message from the second service node comprises:
receiving an extended Aggregate Server Access Protocol (ASAP) protocol message or a newly defined message comprising the first message from the second service node.

3. The method according to claim 1, further comprising:
synchronizing the first message from the second service node with the management configuration device.

4. The method according to claim 3, wherein synchronizing the first message from the second service node with the management configuration device comprises:
extending an Aggregate Server Access Protocol (ASAP) protocol message or defining a new message; and
synchronizing the extended ASAP protocol message or the new message with the management configuration device.

5. The method according to claim 1, wherein:
the service node query request is a service node relocation request;
the service node relocation request comprises a service node relocation constraint;
searching the service node database comprises searching the service node database to obtain second service node information corresponding to the service node relocation request, wherein the second service node information comprises identifier and location information of a source node that meets the service node relocation constraint and identifier and location information of a destination node that meets the service node relocation constraint; and
sending the second service node information to the management configuration device comprises causing the management configuration device to instruct, according to the second service node information, the source node to perform a deregistration operation, and to activate the destination node to serve the user.

6. The method according to claim 1, further comprising:
synchronizing, by the service node pool registrar, the first service node information with another service node pool registrar.

7. The method according to claim 1, further comprising:
establishing an overlay tunnel according to the service chain path.

8. A service node pool registrar, comprising:
a processor; and
a non-transitory computer-readable storage medium storing a program, the program including instructions that, when executed by the processor, cause the processor to perform operations comprising:
receiving, using a transceiver and from a management configuration device, a service node query request, wherein the service node query request comprises a service requirement for configuring a first service node of a plurality of service nodes, wherein the service requirement is from a user or is caused by a network change, and wherein the service node pool registrar, the management configuration device, and the plurality of service nodes are part of a virtualized network that supports a plurality of tenants;
receiving, using the transceiver and from a second service node of the plurality of service nodes, a first message comprising one or more of a registration message, an update message, and a deregistration message, to form a service node database;
searching the service node database, to obtain first service node information that meets the service requirement, wherein the first service node information comprises an identifier of the first service node, location information for the first service node, status information of the first service node, a selection policy for the status information of the first service node, and a tenant identifier; and
calculating a service chain path according to the first service node information, wherein the service chain path indicates a forwarding path between the first service node and another service node of the plurality of service nodes;

performing keep-alive detection on the second service node registered in the service node database;
monitoring a status of the second service node; and
reporting and processing of a fault on the second service node; and
sending, using the transceiver and to the management configuration device, the first service node information and the service chain path, causing the management configuration device to apply network and service configuration to the first service node according to the first service node information and the service chain path.

9. The service node pool registrar according to claim 8, wherein receiving the first message from the second service node comprises:
receiving an extended Aggregate Server Access Protocol (ASAP) protocol message or a newly defined message comprising the first message from the second service node.

10. The service node pool registrar according to claim 8, wherein the program further includes instructions for:
synchronizing the first message from the second service node with the management configuration device.

11. The service node pool registrar according to claim 1, wherein synchronizing the first message from the second service node with the management configuration device comprises:
extending an Aggregate Server Access Protocol (ASAP) protocol message or defining a new message; and
synchronizing the extended ASAP protocol message or the new message with the management configuration device.

12. The service node pool registrar according to claim 8, wherein:
the service node query request is a service node relocation request;
the service node relocation request comprises a service node relocation constraint; and
the first service node information comprises identifier and location information of a source node that meets the service node relocation constraint and identifier and location information of a destination node that meets the service node relocation constraint.

13. The service node pool registrar according to claim 8, wherein the program further includes instructions for:
establishing, using the transceiver, an overlay tunnel according to the service chain path.

14. A management configuration device, comprising:
a processor; and
a non-transitory computer-readable storage medium storing a program, the program including instructions that, when executed by the processor, cause the processor to perform operations comprising:
sending, to a service node pool registrar, a service node query request, wherein the service node query request comprises a service requirement for configuring a first service node of a plurality of service nodes, wherein the service requirement is from a user or is caused by a network change, and wherein the service node pool registrar, the management configuration device, and the plurality of service nodes are part of a virtualized network that supports a plurality of tenants;
in response to sending the service node query request, receiving, from the service node pool registrar, service node information that meets the service requirement, wherein the service node information comprises an identifier of the first service node, location information for the first service node, status information of the first service node, a selection policy for the status information of the first service node, a tenant identifier, and a service chain path, wherein the service chain path indicates a forwarding path between the first service node and another service node of the plurality of service nodes, and wherein the service chain path has been calculated by the service node pool registrar according to the service node information;
applying network and service configuration to the first service node according to the service node information;
sending, to the service node pool registrar, a service node relocation request, wherein the service node relocation request comprises a service node relocation constraint;
in response to sending the service node relocation request, receiving, from the service node pool registrar, second service node information, wherein the second service node information comprises identifier and location information of a source node that meets the service node relocation constraint and identifier and location information of a destination node that meets the service node relocation constraint; and
in response to receiving the second service node information, causing the source node to perform a deregistration operation and activating the destination node to serve the user, according to the second service node information.

15. The management configuration device according to claim 14, wherein applying network and service configuration to the first service node comprises:
obtaining network topology information; and
calculating an optimized service chain path according to the service node information and to the network topology information.

16. A method, comprising:
receiving, by a service node pool registrar and from a management configuration device, a service node query request, wherein the service node query request comprises a service requirement for configuring a first service node of a plurality of service nodes, wherein the service requirement is from a user or is caused by a network change, wherein the service node query request is a service node relocation request, wherein the service node relocation request comprises a service node relocation constraint, and wherein the service node pool registrar, the management configuration device, and the plurality of service nodes are part of a virtualized network that supports a plurality of tenants;
searching, by the service node pool registrar, a service node database to obtain first service node information that meets the service requirement and to obtain second service node information corresponding to the service node relocation request, wherein the first service node information comprises an identifier of the first service node, location information for the first service node, status information of the first service node, a selection policy for the status information of the first service node, and a tenant identifier, wherein the second service node information comprises identifier and location information of a source node that meets the service node relocation constraint and identifier and location information of a destination node that meets the service node relocation constraint;

calculating, by the service node pool registrar, a service chain path according to the first service node information, wherein the service chain path indicates a forwarding path between the first service node and another service node of the plurality of service nodes;

sending, by the service node pool registrar to the management configuration device, the first service node information and the service chain path, causing the management configuration device to apply network and service configuration to the first service node according to the first service node information and the service chain path; and sending the second service node information to the management configuration device comprises causing the management configuration device to instruct, according to the second service node information, the source node to perform a deregistration operation, and to activate the destination node to serve the user.

17. A service node pool registrar, comprising:

a processor; and a non-transitory computer-readable storage medium storing a program, the program including instructions that, when executed by the processor, cause the processor to perform operations comprising:

receiving, using a transceiver and from a management configuration device, a service node query request, wherein the service node query request comprises a service requirement for configuring a first service node of a plurality of service nodes, wherein the service requirement is from a user or is caused by a network change, wherein the service node query request is a service node relocation request, wherein the service node relocation request comprises a service node relocation constraint, and wherein the service node pool registrar, the management configuration device, and the plurality of service nodes are part of a virtualized network that supports a plurality of tenants;

searching a service node database, to obtain first service node information that meets the service requirement, wherein the first service node information comprises an identifier of the first service node, location information for the first service node, status information of the first service node, a selection policy for the status information of the first service node, a tenant identifier, identifier and location information of a source node that meets the service node relocation constraint, and identifier and location information of a destination node that meets the service node relocation constraint; and calculating a service chain path according to the first service node information, wherein the service chain path indicates a forwarding path between the first service node and another service node of the plurality of service nodes; and sending, using the transceiver and to the management configuration device, the first service node information and the service chain path, causing the management configuration device to apply network and service configuration to the first service node according to the first service node information and the service chain path;

sending the second service node information to the management configuration device comprises causing the management configuration device to instruct, according to the second service node information, the source node to perform a deregistration operation, and to activate the destination node to serve the user.

\* \* \* \* \*